Jan. 21, 1969    R. B. CURRIE ET AL    3,422,632
CRYOGENIC REFRIGERATION SYSTEM
Filed June 3, 1966    Sheet 2 of 2
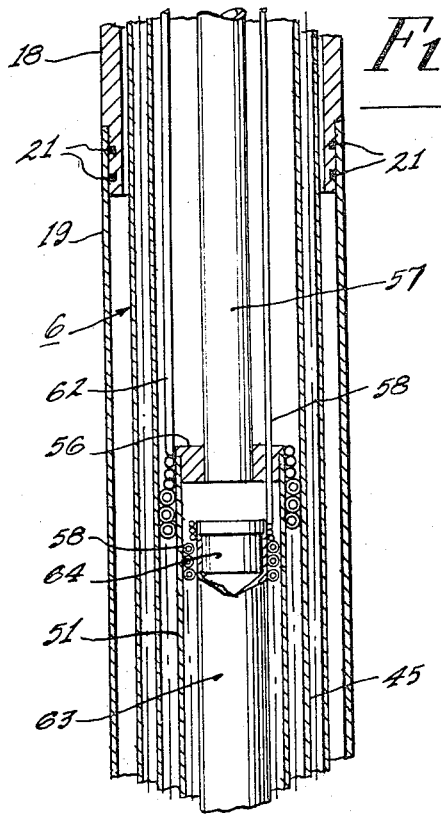
Fig.2
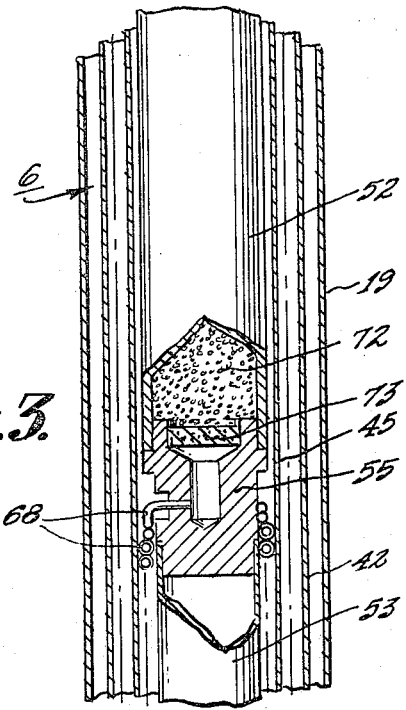
Fig.3
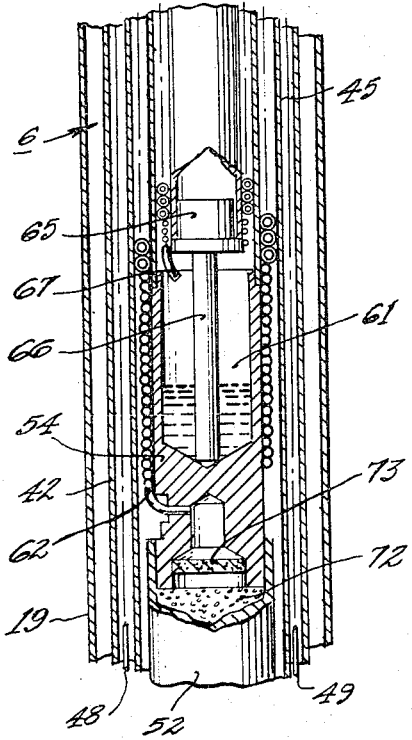
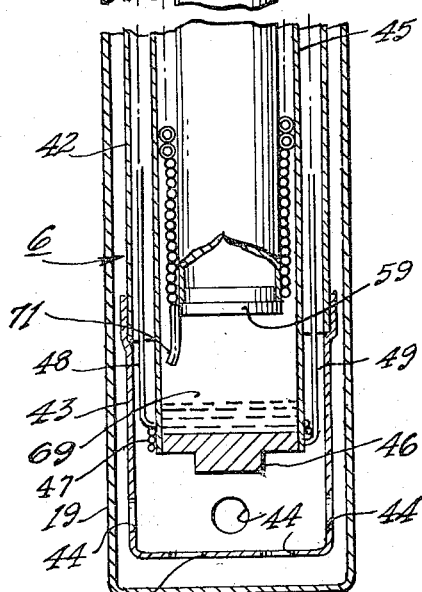
INVENTORS.
ROBERT B. CURRIE,
MARTIN S. SELLINGER &
HENRY F. VILLAUME
BY William Klabunde
ATTORNEY.

United States Patent Office 3,422,632
Patented Jan. 21, 1969

3,422,632
CRYOGENIC REFRIGERATION SYSTEM
Robert B. Currie, Bethlehem, Martin S. Sellinger, Allentown, and Henry F. Villaume, Emmaus, Pa., assignors to Air Products and Chemicals, Inc., Philadelphia, Pa., a corporation of Delaware
Filed June 3, 1966, Ser. No. 555,129
U.S. Cl. 62—45     16 Claims
Int. Cl. F25b 1/10, 9/00, 5/00

ABSTRACT OF THE DISCLOSURE

A cryogenic refrigeration system for cooling to temperatures below —450° F. provides stagewise cooling by successive utilization of normally-gaseous cryogenic refrigerants in descending order of their boiling points, the first of which refrigerants is supplied to the system in liquid phase and the remaining of which are supplied in gaseous phase from pressurized sources at ambient temperature. A preferred group of refrigerants, in the order of use for temperature reduction in a three-stage system are nitrogen, hydrogen and helium. If needed, preliminary removal of water from the gaseous refrigerants may be effected externally by means of warm adsorbers. Further purification of the gaseous refrigerants for removal of solid contaminants is effected internally by means of cold adsorbers. The unit comprises a Dewar flask, providing a reservoir for a body of the liquid refrigerant, and an elongate, dependent heat-exchanger core surrounded, in order, by a radiation shield and a shroud. Continuous insulating vacuum space surrounds the Dewar reservoir and extends the full length of the heat exchanger core at both sides of the radiation shield. Separate and progressive liquefaction of the gaseous refrigerants is effected by Joule-Thomson cooling effect at spaced locations along the path through the heat exchanger core, whereat the liquefied refrigerants are maintained individually as a liquid pool, the liquefaction and accumulation of the refrigerant of lowest boiling point being effected in the lowermost end portion of the unit, which is the refrigeration zone containing the specimen to be cooled. In traversing the unit, optimum utilization of indirect heat exchange is afforded between downwardly and upwardly flowing streams of refrigerants in initial gaseous state, in liquefied state achieved by Joule-Thomson effect, and in subsequent gaseous state resulting from boil-off of accumulated liquid. Maximal utilization of the liquid refrigerant is provided, in that it serves as a coolant, successively, for the incoming gaseous refrigerants, the cold adsorbers, the radiation shield and the specimen to be cooled. In the latter function, use is made of a liquid siphon by which liquid refrigerant is conveyed through the entire heat exchanger core from the Dewar reservoir to the refrigeration zone where it serves by indirect heat exchange to keep the specimen holder cold during periods of rapid turnaround or changeover in multiple testing operations.

This invention relates to cryogenic refrigeration systems, commonly referred to as cryostats, for rapidly effecting extreme low-temperature cooling, and has particular reference to those cryogenic refrigeration systems utilizing the well-known Joule-Thomson effect.

The invention has broad application to airborne and space travel systems, wherein weight, compactness, and efficiency are prime considerations, as well as to ground station and laboratory systems in which compactness, ease of operation, and rapid adjustability, the latter consideration being especially important where multiple testing operations are involved and rapid turnaround is highly desirable.

Specific applications to which the system readily lends itself, though by no means limited thereto, are various types of spectroscopy; cooling of infrared detectors; field ion microscopy; temperature sensor calibration; and magnetic properties studies.

Systems of the type to which the invention relates have been in general use, but have not achieved maximum efficiency and usefulness in those applications where cooling to extremely low temperatures, such as below —450° F., is desired; where repeat cooling operations are necessary in multiple consecutive testing; or where it is desired, for reasons of economy, to utilize a minimum of expensive or not readily available refrigerant material. Heretofore cooling to such extreme low temperature has generally been accomplished through the use of liquid helium, along with other refrigerant materials such as hydrogen and nitrogen. Liquid helium, however, is relatively expensive and may be used only infrequently. It may therefore not be readily available as a stock item in laboratories. Furthermore, the frequent turnaround necessary for multiple testing operations, requires rapid decrease and increase of temperature over a broad temperature range for each turnaround. The temperature range may be from ambient temperature to the lowest temperature required for the desired cooling, such as below —450° F., which is wasteful of refrigerant material.

Since liquid nitrogen is generally readily available, and is required in various laboratory operations, the present invention contemplates a maximum effective use of liquid nitrogen and avoidance of the use of liquid helium, a reduction in wastage of refrigerant through boil-off, and the avoidance of certain problems of storage between periods of use, to minimize costs of operation with respect to refrigerant materials.

Joule-Thomson refrigeration systems in, general, are in wide commercial or industrial and laboratory use in the refrigeration art, and their mode of operation therefore requires no detailed description. The application of the Joule-Thomson cooling effect to lightweight compact, refrigeration units, such as cryostats for producing extreme low temperature cooling, in either open or closed cycle operation, also is well known in the cryogenic art.

It is a primary object of the invention to provide a compact, light weight, economical refrigerator capable of producing up to about 500 milliwatts of refrigeration at temperatures as low as liquid helium temperature (below about —450° F.) from standard compressed cylinder gases, such as hydrogen and helium which may be supplied at ambient temperature, and with utilization of liquid nitrogen as coolant material to minimize operating cost and to maximize convenience of operation.

It is a further object of the invention to most efficiently utilize the selected refrigerant gas or gases and the liquid nitrogen so as to provide a cascade type of rapid temperature reduction in which the temperature is lowered in successive stages, the number of stages employed being variable and a matter of choice dependent upon the minimum temperature desired.

These and other objects are effected by the invention, a fuller understanding of which may be had by reference to the following description and claims taken in connection with the accompanying drawings forming a part of this application, in which the refrigerator comprising a preferred form of the invention is illustrated in broken view, with enlargement of portions thereof to more clearly reveal the details of construction. This mode of illustration is believed most effective to show the details of the inner structure which, because of the considerable length of the device in relation to its lateral dimensions, might otherwise require additional enlarged fragmentary views.

In the drawings:

FIGURE 2 is an enlarged fragmentary view showing the upper end of the long, relatively-narrow core section of the unit which depends from the portion illustrated in FIG. 1; and FIGURE 3 is a fragmentary continuation of the enlarged core section of FIG. 2 showing the lower end of the refrigerator.

Figure 1:
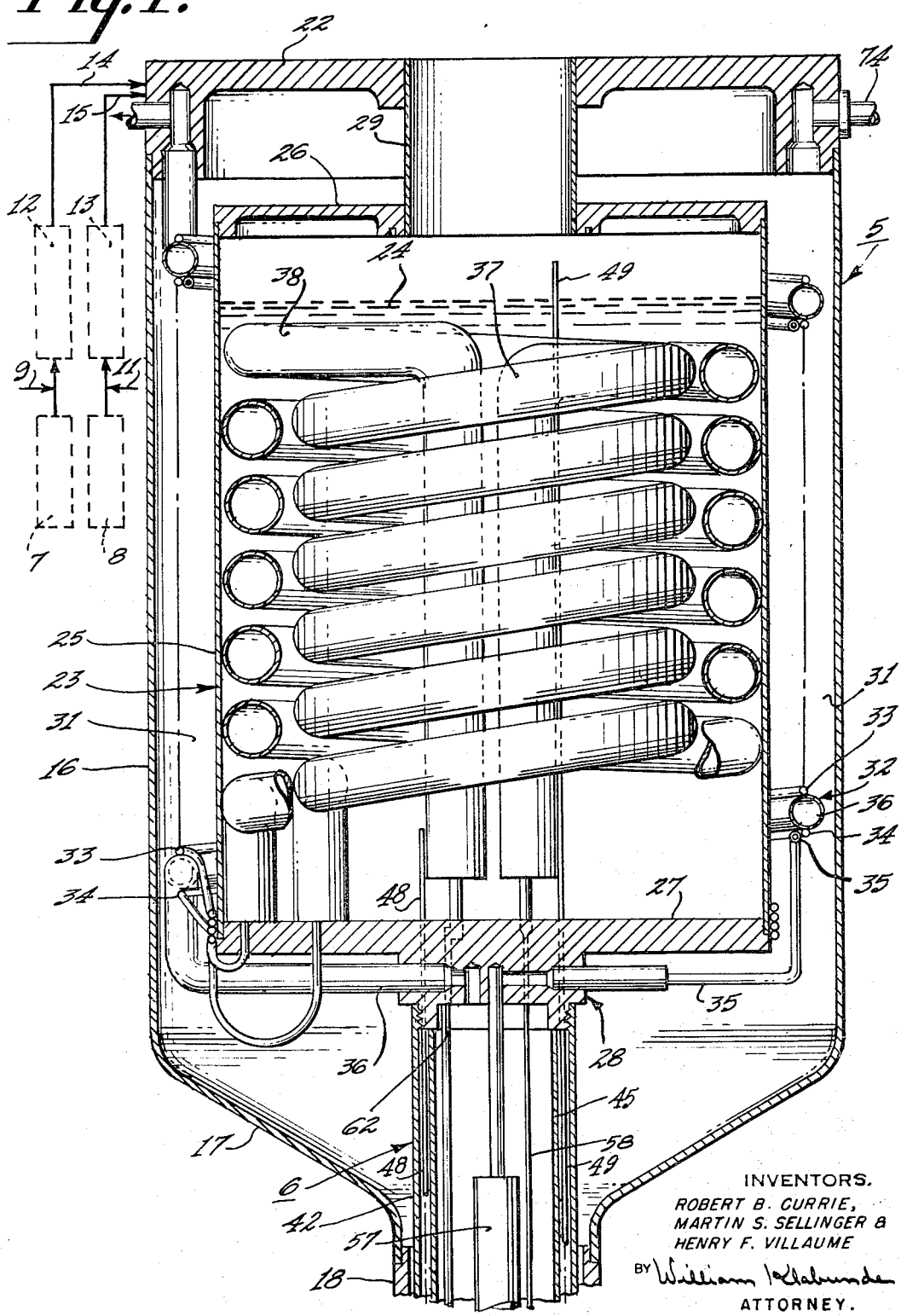
FIGURE 1 is a partially-diagrammatic fragmentary view showing the upper enlarged end of the refrigerator in sectional elevation, as well as external elements forming part of the system, such as gaseous refrigerant supply and purification means.

In FIGS. 2 and 3 intermediate portions of long elements have been broken away to shorten the views, without eliminating any details of construction.

The elongated core section of the refrigerator unit comprises a series of heat exchanger coils each wound about a mandrel. The coil section is contained within a tubular shell surrounded by a tubular metallic radiation shield. The shielded unit is then completely enclosed within a larger diameter tubular shroud. The shield has openings which provide continuous vacuum inside and outside the shield. The tubular core assembly depends axially from the lower end of the cylindrical shell assembly.

The shell assembly comprises a relatively wide outer cylindrical shell or housing and an inner concentric reservoir separated by a vacuum space. The upper ends of the shell and reservoir are covered. A short conduit having its ends set in the spaced cover plates forms a filler tube for introduction of liquid coolant into the reservoir. The conduit serves also to vent the reservoir chamber to the atmosphere.

In accordance with the invention, the reservoir of the shell assembly is filled to a high level with liquid coolant material having a boiling point higher than any of the gaseous refrigerant materials employed, so that the incoming gaseous refrigerant material may be precooled. The refrigerant gases, provision being made for two in the illustrated embodiment of the invention, have widely different boiling points, one being substantially at the lowermost temperature sought to be obtained by the refrigerator unit and the other being at an intermediate level between the latter boiling point and the boiling point of the liquid colant maintained in the reservoir.

Although the invention is applicable to systems utilizing various combinations of liquid coolant with gaseous refrigerant material or materials, dependent upon the degree of extreme low temperature cooling desired, it utilizes to greatest advantage for ultimate cooling below −450° F. a combination of liquefied nitrogen as the liquid coolant, gaseous hydrogen as a second stage coolant and gaseous helium as a third stage or final coolant. For convenience of description the construction and operation of the refrigerator unit will be made hereinafter with reference to nitrogen, hydrogen and helium as coolant or refrigerant materials.

The liquid nitrogen is poured into the reservoir through the filler tube inlet, which serves also as a vent to the atmosphere, and is maintained therein as a body of liquid not quite filling the reservoir. Replacement of boil-off nitrogen, which is minimal, may be made continuously or from time to time.

The gaseous hydrogen and helium is supplied at substantially ambient temperature from pressurized sources. These sources may be standard containers of gas or they may comprise recycle gas if it is desired to operate wholly or partly in closed cycle. The gases may first be passed through separate adsorber means, primarily for water removal. The refrigerant supply streams of hydrogen and helium are then conveyed into the dewar and pass through separate tubes traversing the vacuum insulation space between the dewar shell and reservoir, a downstream portion of each refrigerant supply tubes being arranged in good thermal contact with the outer wall of the reservoir at its end. In traversing the entire dewar vacuum space the refrigerant tubes are in good heat exchange contact also with gaseous refrigerant return tubes which pass through the same vacuum space and exhaust the gases either to the atmosphere or to external repressuring and recycling means, if such are provided.

Conveniently, though not essentially, the two gaseous refrigerant inlet tubes and the two gaseous refrigerant outlet tubes traverse the vacuum space between the dewar shell and reservoir as a four-tube assembly wound as a single helical coil surrounding the reservoir, the tubes being in good thermal contact with each other. Near the end of the run through the vacuum space the inlet tubes are separated from the outlet tubes, the former being wound several turns about the cold wall of the reservoir and being joined thereto in good thermal connection, and the latter being attached to a fitting which joins the reservoir vessel to the elongated, shroud-enclosed core assembly which depends therefrom. The tubes conveying the gaseous refrigerant materials are sized according to requirements, considering the flow and temperature conditions prevailing. As a practical arrangement, high pressure tubing of small diameter is used for the incoming gaseous refrigerants and low pressure tubing of larger diameter is used for the outgoing gaseous refrigerants. Thus, while passing through the vacuum space of the upper or head portion of the refrigerator unit the incoming refrigerants and the outgoing refrigerants are in good indirect heat exchange relationship with each other, and the incoming refrigerants are additionally, during a final portion of their travel through the vacuum space, in good indirect heat exchange relationship with the liquid nitrogen reservoir.

After being wound several turns about the reservoir wall, the refrigerant inlet tubes may communicate with the interior of the reservoir through suitable fittings in the wall thereof and may be connected to adsorber coils of substantially larger tube size, packed with adsorbent material such as activated charcoal, and submerged within the body of liquid nitrogen. These may be referred to as cold adsorbers, in contrast to any external warm adsorbers for purifying the gaseous refrigerants before admission to the refrigerator unit. Cold adsorbers may be used to remove nitrogen and other low-boiling-temperature contaminants. The discharge ends of the cold adsorbers would then be connected to the aforementioned fitting which joins the reservoir to the core assembly in the elongated stem of the unit, through which fitting the cooled refrigerant gases are introduced to the heat exchanger system wtihin the core assembly.

The heat exchanger core assembly comprises a radiation-shielded, vacuum-insulated core of multiple mandrel sections connected end-to-end and having extended-surface heat exchanger coils wound thereon to provide counterflow cooling. The mandrel sections are joined end-to-end by connectors. The entire coil-wound core is inserted in sliding fit within a tubular shell which is radially spaced from the surrounding radiation shield. The bottom portion of the encircling radiation shield is provided with a removable closure having bottom and/or side perforations so that continuous vacuum communication is provided between the annular space separating the shroud and the radiation shield and the annular space separating the radiation shield and the heat exchanger shell. The perforations may also facilitate observation of or experimentation on an enclosed sample.

The lower end of the dewar shell surrounding the reservoir is provided with a central fitting having an opening through which freely passes the tube forming the elongated radiation shield. The upper end of the shroud is removably attached to the central fitting, in air-tight connection, such as by suitable seal rings. The conduit forming the radiation shield is attached to a central, multiport fitting in the bottom wall of the reservoir through which the incoming and outgoing refrigerant gases are passed between the heat exchanger core assembly and the dewar shell assembly.

The tubular shell containing the heat exchanger core assembly has its upper end attached to the multi-port fitting in the bottom wall of the reservoir. Its lower end may be provided with a closure member which has provision for a specimen holder to be attached.

The heat exchanger core assembly comprises a plurality of sections arranged longitudinally end-to-end within the shell and terminating short of its lower end. First, in downward order, there is a hydrogen cooling section wherein the precooled hydrogen gas stream is liquefied by Joule-Thomson effect and collected in a pool. The hydrogen cooling system is surrounded by and in indirect heat exchange relation with both incoming and outgoing streams of helium; second, there may be an adsorber section packed with suitable adsorbent, such as activated charcoal, for removing contaminants from the helium gas stream which has already been cooled to a temperature near the boiling point of hydrogen; and, finally there is a helium cooling section wherein the precooled helium is liquefied by Joule-Thomson effect to provide a pool of liquid helium at the bottom of the shell in indirect heat exchange with the specimen holder.

The sections of the heat exchanger core assembly each comprise a mandrel which is rigidly connected to the adjacent mandrel section. The joined sections are all spaced from the walls of the shell to provide therebetween a continuous annular passageway for upward flow of gaseous helium rising from the liquid helium pool at the bottom of the shell, as well as space for coil windings of heat exchanger tubing about the aforementioned core sections.

The first or uppermost mandrel section is hollow, and contains a smaller-size inner mandrel spaced inwardly from the walls thereof to provide an annular passageway. The annular passageway contains a coil of heat exchanger tubing through which the incoming precooled gaseous hydrogen gas is passed. The precooled hydrogen gas is discharged from the lower end of the inner heat exchanger coil and is liquefied by Joule-Thomson effect to form a pool of liquid hydrogen at the bottom of the first hollow mandrel. Boil-off from the liquid hydrogen pool passes upwardly through the annular space containing the hydrogen heat exchanger coil and is discharged from the core assembly through the aforementioned multi-port fitting in the bottom wall of the reservoir. The boil-off gaseous helium from the liquid helium pool at the bottom of the shell flows upwardly between the shell and the core assembly and also is discharged through the multiport fitting. The outgoing or return hydrogen and helium gas streams are separately passed from the fitting into the respective windings of the precooler coil assembly located in the vacuum space surrounding the reservoir.

The outgoing hydrogen and helium gas streams flow through the precooler coil assembly countercurrently to, and in indirect heat exchange relation with, the incoming streams of hydrogen and helium. After passing through the precooler coil assembly the hydrogen and helium gases are discharged from the refrigerator unit and are either vented to the atmosphere or recovered for recycle purposes.

In order to provide rapid cooling of the tip portion of the refrigerator which holds the specimen to be cooled, so that there will be a minimum of delay during turnaround periods when numerous specimens are to be cooled successively, a thermal siphon is provided. It comprises a U-tube having its lower end portion wound several turns about, and in good thermal contact with, the lower end portion of the shell, adjacent to the specimen holder. The side branches of the U-tube extend upwardly along the outside of the shell and pass through, and are sealed within, openings in the bottom wall of the reservoir. One branch of the thermal siphon terminates within the body of liquid nitrogen and the other terminates within the free space above the pool. Cold liquid nitrogen flowing down the tube during the cooldown period rapidly lowers the temperature of the specimen. When the cooling effected by the refrigerant gases lowers the tip temperature below the freezing point of the liquid nitrogen, the nitrogen in the bottom portion of the U-tube freezes. When specimens are being changed or when operation of the refrigerator is temporarily discontinued, the temperature at the tip rises to a level above the freezing point of nitrogen, whereupon the solid nitrogen at the bottom of the thermal siphon is again liquefied and the portion of the heat exchanger core adjacent to the specimen holder is held at liquid nitrogen temperature so long as liquid nitrogen remains in the reservoir.

For a more detailed description of the invention in one preferred practicable embodiment thereof reference may be had to the drawings.

The illustrated embodiment represents a relatively small-size-refrigerator unit capable of producing about 500 milliwatts of refrigeration at liquid helium temperature, that is in the range below about $-450°$ F., and having a liquid nitrogen capacity of about 1 liter. For example the dewar portion may be about 6 inches in diameter and the unit, including the shroud, may be about 26 inches in height.

The refrigerator unit comprises an upper cylindrical dewar section 5 and an elongated tubular heat exchanger core section 6 depending from the dewar section, as shown in FIG. 1. FIGS. 2 and 3 show successive enlarged fragmetary portions of the core section 6, progressing downward.

The refrigerator is supplied with gaseous hydrogen and helium from pressurized sources, such as commerical cylinders of pressurized gas maintained at ambient temperature. The cylinders are diagrammatically illustrated, and designated by numerals 7 and 8, respectively. If desired to operate wholly or partly as a closed system, recycle hydrogen and/or helium may be supplied through lines 9 and 11.

The hydrogen and helium are passed through separate warm adsorbers, diagrammatically illustrated and designated by numerals 12 and 13, respectively, for purification purposes, particularly with respect to water removal. From the adsorbers 12 and 13 the dry hydrogen and helium gases are conveyed by supply lines 14 and 15 to the head portion of the dewar section where they are introduced through suitable inlet fittings, not shown, into the vacuum space of the dewar. The points of introduction are angularly spaced along the circumference of the vessel in known manner, so that detailed illustration is not considered necessary.

The dewar section 5 comprises an upright, cylindrical outer shell or housing 16 having a funnel-shaped bottom portion 17 terminating at a connector fitting 18 for the removable shroud 19 wholly encasing the core section 6, as shown in FIGS. 2 and 3. The shroud 19 is frictionally held on a reduced end portion of the fitting 18 by compressible O-rings 21.

The top of the dewar shell 16 is closed by a head 22 which is provided with ports for incoming and outgoing hydrogen and helium gas lines. The disposition of these ports is not material to the invention so their method of illustration and their location are diagrammatic in the interest of eliminating unnecessary detail from the drawings.

Concentrically positioned within the shell 16 there is a smaller and shorter cylindrical vessel 23 forming a reservoir to contain a body of liquid nitrogen 24. Vessel 23 comprises a cylindrical body section 25, a head 26 and a bottom closure 27. Bottom closure 27 has a central multiport fitting 28, conveniently illustrated as forming an integral port of the closure, although it may comprise a separate fitting removably attached thereto.

A short tubular member 29 has its ends set in the shell head 22 and the reservoir head 26 to provide an inlet for liquid nitrogen into the reservoir. Tube 29 also provides a vent to the atmosphere.

The enclosed annular space 31 between the vertical walls of the dewar shell and the reservoir, and the spaces above and below the reservoir which are a continuation thereof, comprise a space for insulating vacuum.

Within the annular vacuum space 31 there is a four-tube helical coil, generally indicated by numeral 32, comprising a pair of small-size tubes 33 and 34 for conveying the incoming hydrogen and helium gases, respectively, a slightly larger-size tube 35 for conveying outgoing hydrogen gas, and a relatively large-size tube 36 for conveying outgoing helium gas.

The four parallel tubes are joined along their sides in good thermal connection so that there is effective indirect heat exchange between the incoming gases and the lower temperature outgoing gases flowing countercurrently thereto.

At the lower end of coil 32 the component tubes are separated, the two small-size tubes 33 and 34 being wound several turns around, and being joined in good thermal connection to, the lower end of the reservoir vessel 23, and then passing through openings in the bottom closure 27. The ends of larger-size tubes 35 and 36 are connected to the multi-port fitting 28 through which they communicate with the outgoing hydrogen and helium passageways within the core section 6.

Within the reservoir 23, and completely submerged within the body of liquid nitrogen 24, there are two cold adsorber coils 37 and 38, one within the other, to which the incoming hydrogen tube 33 and the incoming helium tube 34 are respectively connected.

The radiation shield 42 is a tube having its upper end secured to a reduced portion of the fitting 28 and extending downward to a point near the bottom of tubular shroud 19. The lower end of shield 42 has a removable, friction-fitted cup 43 with openings 44 in its bottom. There is thus vacuum area both inside and outside the shield. Removal of shroud 19 and cup 43 permits immediate access to the specimen holder, so that change of specimens may readily be effected.

Within radiation shield 42 there is a spaced shell 45 having its upper end set in a central opening in the reduced bottom portion of fitting 28 and extending downward to a point near the bottom of the shield. Shell 45 is closed at its lower end by a member 46, the bottom of which is adapted to hold the specimens to be cooled.

A length of tubing has its midsection wound several turns around the lower end of shell 45 and in good thermal contact therewith to provide a heat exchanger coil 47 for liquid nitrogen. One branch 48 of the tubing extends upwardly along the outside of shell 45, passes through an opening in fitting 28 and terminates at a low level within the reservoir formed by vessel 23. It is constantly submerged within the body of liquid nitrogen 24. The other branch 49 of the tubing also extends upwardly along the outside of shell 45, conveniently on the opposite side of the shell tube, then passes through fitting 28, and terminates in the upper region of the reservoir, above the body of liquid nitrogen 24. There is thus formed a U-tube thermal siphon which provides rapid cooling at the tip of the refrigerator.

Within shell 45 there is a three-section mandrel comprising hollow tube sections 51, 52, and 53 connected end-to-end by plug connectors 54 and 55. The uppermost tube section 51 is closed at its upper end by a plug 56. Plug 56 has a central opening to receive the lower end of a conduit 57 which passes upwardly into fitting 28, where it communicates through a side port with the outgoing hydrogen tube 35 in the dewar vacuum space. Plug 56 has also an off-center opening through which is passed exchanger coil tubing 58 connecting at its upper end, through fitting 28, with the adsorber coil 37 in the reservoir 23. Lowermost tube section 53 is provided with a solid plug 59 at its lower end.

Intermediate plug connector 54, which joins mandrel tube sections 51 and 52, is end-drilled at both ends, the upper to provide a deep reservoir 61 for liquid hydrogen and the lower to provide, through a side port, access for the lower end of heat exchanger coil tubing 62. Tubing 62 is wound around the tube section 51 and connects at its upper end, through fitting 28, with the adsorber coil 38 in the reservoir 23. The midsection of coil 62 is finned, while the upper and lower ends are plain. The lower end portion of coil 62 is wound around and in good thermal contact with plug member 54.

Within upper mandrel tube section 51 there is a separate and shorter internal mandrel tube 63. A plug 64 closes the upper end of tube 63 and a plug 65, having a downward axial extension 66, closes its lower end. Extension 66 has its tip resting in the bottom of the drilled hole forming reservoir 61. Coil tubing 58 is wound around mandrel 63 and extends into the reservoir space 61, where it terminates in a Joule-Thomson orifice tip 67. The midsection of coil 58 is finned, while the top several turns and the bottom turns encircling the mandrel 63 are plain.

Intermediate plug connector 55 which joins mandrel tube sections 52 and 53 is drilled at its upper end and then side drilled to receive the upper end of heat exchanger coil tubing 68. Coil tubing 68 is wound around mandrel tube section 53 and extends into a reservoir space 69 provided at the bottom of shell 45, where it terminates in a Joule-Thomson orifice tip 71. As with coil 58, the initial and terminal portions of coil 68 are plain and the intermediate portion is finned.

Intermediate mandrel tube section 52 is packed with adsorbent material 72, such as activated carbon. Porous filter discs 73 are provided within each end of tube 52, being set in counterbored portions of the end-drillings in the plug connectors 54 and 55.

There is thus provided a continuous flow path for upward countercurrent flow of refrigerant gas within the annular space formed between the inner wall of shell 45 and the outer surfaces of the three-section mandrel, that is, the space occupied by heat exchanger coils 62 and 68. There is provided also a flow path for upward countercurrent flow of refrigerant gas within the annular space between the inner wall of mandrel tube section 51 and the outer wall of its contained separate mandrel tube 63, that is, the space occupied by heat exchanger coil 58. At the upper end of shell 45 a port is provided in the multiport fitting 28, so that the outgoing gas from sleeve 45 may be conveyed into the largest-size tube 36 of the four-conduit coil 32 in the dewar vacuum space.

In the operation of the device, with hydrogen and helium as the gaseous refrigerants, gaseous hydrogen flows downwardly through heat exchanger coil 58 and is liquefied by expansion at the orifice 67. The liquid hydrogen collects in a pool in the bottom of reservoir 61. Boil-off gaseous hydrogen from the liquid pool flows countercurrently upward through the annular space containing coil 58 to provide indirect heat exchange between the incoming and outgoing gaseous hydrogen streams. Gaseous helium flows serially downwardly through heat exchanger coil 62, the adsorber section containing adsorbent material 72, and heat exchanger coil 68, and is liquefied by expansion at the orifice 71. The liquid helium collects in a pool in the bottom of reservoir 69. Boil-off gaseous helium from the liquid pool flows countercurrently upward through the annular space containing coil 62, the annular coil-free space around mandrel tube section 52 and the annular space containing coil 68 to provide indirect heat exchange between the incoming and outgoing helium gas streams. Some indirect heat exchange is effected also between the hydrogen and helium flowing on opposite sides of the upper mandrel tube 51.

To supply initial vacuum and to restore vacuum after turnaround, a fitting 74 is provided in the head cover 22 for connection to a vacuum pump, not shown.

With respect to the head 22 of shell 16 in the dewar section 5, and to the bottom closure 27 and the associated multiport fitting 28 of vessel 23 forming the liquid nitrogen reservoir, it is to be understood that the particular configuration with respect to inlet and outlet ports for fluid materials entering and leaving the refrigerator unit and for fluid materials passing between the dewar and core sections forms no part of the invention and is therefore not shown in detail. Since the ports are conveniently spaced angularly around the axis of the cylindrical unit additional plan and cross-sectional views would be required to completely illustrate their arrangement, which is considered unnecessary for a complete understanding of the invention.

As to mode and conditions of a typical operation, liquid nitrogen at a temperature of about −320° F. is poured into the dewar reservoir 23 which, being vented by the inlet tube 29, is at atmospheric pressure. The liquid nitrogen may be supplied from a pressurized liquid nitrogen dewar and conventional liquid level control means may be provided to keep the reservoir at constant level, neither of which is shown.

Gaseous hydrogen and helium may be supplied to the refrigerator unit from standard pressurized tanks, with conventional intermediate arrangement of high pressure regulators, flow meters, control valves, pressure gauges, etc., all as needed.

In a typical operation hydrogen gas at about 850 p.s.i.g. and ambient temperature is supplied to the unit at a rate of approximately 26 L/min. and helium gas at about 500 p.s.i.g. and ambient temperature is supplied at a rate of about 37 L/min. The standard pressurized tanks of hydrogen and helium are initially at about 2,200 p.s.i.g. and 2,450 p.s.i.g., respectively.

The hydrogen and helium gas streams are first passed through the so-called warm adsorbers, primarily to remove any contained water, and from the adsorbers are admitted to the dewar section of the unit at pressures of about 850 and 500 p.s.i.g., respectively, and at a temperature of about 75° F. In passing through the coil assembly in the vacuum space the incoming hydrogen and helium gas streams are cooled by indirect heat exchange with the outgoing hydrogen and helium gas streams which discharge at a pressure of about 2 p.s.i.g. and at a temperature of about 50° F.

Within the cold adsorber coils contained within the body of liquid nitrogen the hydrogen and helium gas streams are further cooled to a temperature approaching −320° F. which is the approximate temperature of the liquid nitrogen.

Within the first stage of the heat exchanger core assembly the hydrogen is liquefied by Joule-Thomson effect, with resultant temperature reduction to about −420° F. In passing through the initial heat exchanger section of the core assembly the hydrogen is in indirect heat exchange also with the surrounding helium gas circuit. The incoming helium gas, which was cooled by indirect heat exchange with first, outgoing helium gas, then liquid nitrogen, then again with outgoing helium gas at temperatures down to approximately liquid hydrogen temperature, and finally by indirect heat exchange with liquid hydrogen in reservoir 61, enters the adsorber section of the core assembly at about −420° F.

Within the final cooling stage of the heat exchanger core assembly the cooled helium gas stream is further cooled by indirect heat exchange with outgoing helium gas at temperatures down to approximately liquid helium temperature. Final cooling of the helium gas is effected when the helium is liquefied by Joule-Thomson effect, with resultant temperature reduction to about −452° F. Several distinct advantages are obtained by the apparatus of the invention, principal of which is the fact that cooling to liquid helium temperatures is obtained without requiring the use of liquid helium as one of the supply refrigerants. Unlike liquid helium, the gaseous helium and hydrogen used by the refrigerator can be stored indefinitely. The liquid nitrogen coolant is readily obtainable, is generally a stock item in laboratories, is easier to handle than liquid helium, and is less costly.

Contributing materially to the efficient operation of the unit is the fact that the entire radiation shield which surrounds the heat exchanger core assembly and is wholly within the vacuum space of the shroud is constantly maintained substantially at liquid nitrogen temperature by the coolant effect of the liquid nitrogen.

While the apparatus of the invention has been particularly described in connection with its use for cooling to extreme low temperatures, it is to be understood that for higher temperature refrigeration needs the unit may be operated with a single refrigerant gas in addition to the liquid nitrogen coolant.

Although the apparatus of the invention is described in connection with the use of liquid nitrogen as the coolant material in the reservoir, and with the use of hydrogen as the first stage refrigerant and helium as the second stage refrigerant, it is contemplated that other liquid coolant material and other gaseous refrigerant material or materials may be employed. In any case, the liquid coolant must be the material of highest boiling point and the first stage refrigerant must have a boiling point higher than that of the second stage refrigerant, if two stages are employed.

The apparatus of the invention provides a unique and highly advantageous method of cooling in that the liquid coolant provides cooling at various levels throughout the length of the unit.

First, it precools the incoming streams of refrigerant gas while passing through the dewar vacuum space;

Second, it cools the second adsorber located within the reservoir, if such adsorber is employed;

Third, it cools the radiation shield by conduction, since the upper end of the shield is physically attached to the bottom wall of the reservoir; and Fourth, it cools the specimen holder which is joined to the bottom closure of the shell surrounding the heat exchanger core.

Obviously many modifications and variations of the invention as hereinbefore set forth may be made without departing from the spirit and scope thereof, and therefore only such limitations should be imposed as are indicated in the appended claims.

What is claimed is:

1. A cryogenic refrigeration system comprising, in combination:
 (a) a dewar reservoir for a body of cryogenic liquid coolant;
 (b) a pressurized, ambient-temperature source for gaseous refrigerant having a boiling point lower than that of the liquid coolant;
 (c) first heat exchanger means within the vacuum-insulated space surrounding said reservoir, comprising multiple coils for countercurrent, indirect heat exchange flow between confined streams of incoming gaseous refrigerant from said source and outgoing gaseous refrigerant from the refrigerator, the downstream end portion of the coil for incoming gaseous refrigerant being in indirect heat exchange with the body of liquid coolant in said reservoir;
 (d) a removable, elongated tubular shroud depending from the bottom outer wall of the dewar;
 (e) a tubular radiation shield in good thermal contact with the bottom inner wall of the dewar and depending concentrically into the shroud, said shield having a removable, perforate bottom portion;
 (f) a tubular shell depending from the bottom inner wall of the dewar into the radiation shield and having a bottom closure adapted to externally support a specimen to be cooled; said shroud, shield and shell being radially spaced to provide continuous communicating space for vacuum within the dewar and at both sides of the radiation shield within the shroud;

(g) means for establishing, and restoring after each cooling operation, a vacuum within said vacuum space;

(h) a thermal siphon, substantially in the form of U-tube, having its bottom portion in good thermal contact with the lower end portion of the shell and its side branches extending upwardly along the outside thereof, said branches terminating respectively above and below the surface level of liquid coolant in the reservoir, whereby the lower end of said shell is maintained in constant indirect heat exchange with coolant supplied from the dewar reservoir;

(i) a mandrel within and spaced from the shell to provide an annular passage way for outgoing gaseous refrigerant;

(j) conduit means connecting the upper end of said shell to the coil for outgoing gaseous refrigerant in said first heat exchanger means;

(k) second heat exchanger means, within said annular passageway between the mandrel and the shell, comprising a coil having its lower end arranged to discharge into a space providing a reservoir at the bottom of the shell;

(l) means for connecting the upper end of said second heat exchanger coil to the coil for incoming gaseous refrigerant in said first heat exchanger means; and (m) means at the lower end of said second heat exchanger coil to provide a Joule-Thomson orifice for liquefying the discharging gaseous refrigerant, the liquid refrigerant being collected in a pool maintained in the reservoir at the bottom of the shell, from which reservoir outgoing gaseous refrigerant flows upwardly through said annular passageway in counter-current flow relation to the incoming gaseous refrigerant flowing through said second heat exchanger coil; whereby cooling effect from said liquid coolant is constantly maintained in the downstream end portion of the coil for incoming gaseous refrigerant within the dewar vacuum space, in the radiation shield, and in the lower end portion of the shell.

2. A system as in claim 1, including (m) adsorber means for removing contaminants from said incoming gaseous refrigerant.

3. A system as in claim 2, in which said adsorber means comprises an external adsorber operating substantially at ambient temperature for removing primarily aqueous contaminant from the gaseous refrigerant and an internal adsorber in indirect heat exchange with the body of liquid coolant in the dewar reservoir for removing additional contaminants.

4. A system as in claim 3, in which said internal adsorber comprises coil means, packed with solid absobent material, located wholly within the body of liquid coolant in the dewar reservoir.

5. A system as in claim 1, including means for recycling the gaseous refrigerant.

6. A cryogenic refrigeration system comprising, in combination:

(a) a dewar reservoir for a body of cryogenic liquid coolant;

(b) pressurized, ambient-temperature sources for two gaseous refrigerants having substantially different boiling points, each lower than the boiling point of the liquid coolant;

(c) first heat exchanger means comprising individual incoming and outgoing coils for each gaseous refrigerant, all in good thermal contact with each other, the downstream end portions of the coils for incoming gaseous refrigerants being in indirect heat exchange with the body of liquid coolant in said reservoir.

(d) a removable, elongated tubular shroud depending from the bottom outer wall of the dewar;

(e) a tubular radiation shield in good thermal contact with the bottom inner wall of the dewar and depending concentrically into the shroud, said shield having a removable perforate bottom portion;

(f) a tubular shell depending from the bottom inner wall of the dewar into the radiation shield and having a bottom closure adapted to externally support a specimen to be cooled; said shroud, shield and shell being radially spaced to provide continuous communicating space for vacuum within the dewar and at both sides of the radiation shield within the shroud;

(g) means for establishing, and restoring after each cooling operation, a vacuum within said vacuum space;

(h) a thermal siphon, substantially in the form of U-tube, having its bottom portion in good thermal contact with the lower end portion of the shell and its side branches extending upwardly along the outside thereof, said branches terminating respectively above and below the surface level of liquid coolant in the reservoir, whereby the lower end of said shell is maintained in constant indirect heat exchange with coolant supplied from the dewar reservoir;

(i) a first mandrel within said shell and spaced from the sides and bottom thereof to provide a first annular passageway terminating in a shell reservoir at the bottom of the shell, the upper end portion of said mandrel being hollow;

(j) a second mandrel within the hollow upper end portion of said first mandrel and spaced from the sides and bottom thereof to provide a second annular passageway terminating in a mandrel reservoir at the bottom of said hollow portion of the mandrel;

(k) second heat exchanger means comprising a coil within the portion of said first annular passageway surrounding the hollow upper end portion of the first mandrel, the lower end portion of said second coil being in good thermal contact with the wall of the mandrel reservoir;

(l) third heat exchanger means comprising a coil within the portion of said first annular passageway surrounding the lower end portion of the first mandrel, the lower end portion of said third coil being in good thermal contact with the wall of the shell reservoir;

(m) means for conveying the gaseous refrigerant of lower boiling point from its respective coil in said heat exchanger means to said second heat exchanger coil;

(n) means for conveying the gaseous refrigerant of lower boiling point from said second heat exchanger coil to said third heat exchanger coil;

(o) first Joule-Thomson orifice means at the lower end of the third heat exchanger coil for liquefying the discharging gaseous refrigerant of lower boiling point, the liquid refrigerant being collected in a pool maintained in the shell reservoir, from which reservoir said first annular passageway provides a path for countercurrent flow of outgoing gaseous refrigerant around said second and third heat exchanger coils to the upper end of the shell;

(p) means for conveying the outgoing gaseous refrigerant of lower boiling point from the upper end of said shell to its respective coil in said first heat exchanger means;

(q) fourth heat exchanger means comprising a coil within said second annular passageway;

(r) means for conveying the gaseous refrigerant of higher boiling point from its respective coil in said first heat exchanger means to said fourth heat exchanger coil;

(s) second Joule-Thomson orifice means at the lower end of the fourth heat exchanger coil for liquefying the discharging gaseous refrigerant of higher boiling point, the liquid refrigerant being collected in a pool maintained in the mandrel reservoir, from which reservoir said second annular passageway provides a path for countercurrent flow of outgoing gaseous refrigerant around said fourth heat exchanger coil to the upper end of the mandrel hollow;

(t) means for conveying the outgoing gaseous refrigerant of higher boiling point from the upper end of the mandrel hollow to its respective coil in said first heat exchanger means.

7. A system as in claim 6, including (u) adsorber means for removing contaminant from said incoming gaseous refrigerants.

8. A system as in claim 7, in which said adsorber means comprises an internal adsorber in indirect heat exchange with the body of liquid coolant in the dewar reservoir.

9. A system as in claim 7, in which said adsorber means comprises an internal adsorber is included in said means (n).

10. A system as in claim 9, in which said internal adsorber included in means (n) comprises an adsorbent-packed hollow chamber within the intermediate portion of said first mandrel.

11. A system as in claim 8, in which said internal adsorber means comprises a pair of adsorbent-packed coils submerged within the body of liquid coolant.

12. A system as in claim 7, in which said adsorber means (u) comprises an external adsorber adapted to operate at substantially ambient temperature, primarily for removal of aqueous contaminants, a first internal adsorber located within and adapted to operate substantially at the temperature of said body of liquid coolant, for removal of solid contaminants, and a second internal adsorber connected between said second and third heat exchanger coils for removing additional solid contaminants.

13. A cryogenic refrigerator including:
(a) means forming a first reservoir containing a body of liquid coolant;
(b) first passage means for conveying a high-pressure gaseous refrigerant in heat-exchange relationship with said reservoir in order to cool the gaseous refrigerant;
(c) second passage means having an inlet connected to said first passage means and an outlet portion, remote from and out of heat-exchange relationship with said reservoir, terminating in a Joule-Thomson expansion orifice;
(d) means forming a smaller second reservoir adjacent to said orifice for directly receiving and accumulating the refrigerant liquefied by the Joule-Thomson cooling effect;
(e) means for supporting an article to be cooled in heat-exchange relationship with the accumulated liquefied refrigerant;

(f) third passage means for conveying fluid refrigerant from said second reservoir in countercurrent heat-exchange relationship with said second passage means;
(g) thermally conductive means forming a radiation shield surrounding said second passage means (c), said second reservoir means (d) and said article to be cooled, said radiation shield having a portion thereof in heat-conductive relationship with said first reservoir means (a); and
(h) fourth passage means forming a thermal siphon having its inlet end arranged to receive liquid coolant directly from said first reservoir (a), having an intermediate portion in heat-exchange relationship with said second reservoir (d), and having its outlet end arranged to permit the venting of fluid therefrom.

14. The refrigerator as defined in claim 13, additionally including:
(i) means forming an adsorber immersed in the body of liquid coolant maintained in said first reservoir (a), said adsorber means being connected intermediate said first (a) and second (b) passage means for flow therethrough of the cooled gaseous refrigerant to remove impurities.

15. The refrigerator as defined in claim 14, additionally including:
(j) means forming a continuous space surrounding said reservoir (a), and containing said first passage means (b), and surrounding also said radiation shield (g) and said article supporting means (e), arranged to permit evacuation so as to vacuum-insulate said refrigerator.

16. The refrigerator as defined in claim 15, in which said surrounding means (j) is in part removable to afford access to said article supporting means (e).

References Cited

UNITED STATES PATENTS 2,909,908   10/1959   Pastuhov et al. _____ 62—514
3,195,322   7/1965   London _____ 62—514

OTHER REFERENCES

"A Simple Helium—3 Cryostat," Cryogenics, 1963, Physio-Technical Institute, Academy of Sciences, pp. 207–208 relied on.

LLOYD L. KING, Primary Examiner.

U.S. Cl. X.R.

62—467, 514

UNITED STATES PATENT OFFICE
CERTIFICATE OF CORRECTION

Patent No. 3,422,632                                        January 21, 1969

Robert B. Currie et al.

It is certified that error appears in the above identified patent and that said Letters Patent are hereby corrected as shown below:

Column 3, line 45, "colant" should read -- coolant --. Column 11, lines 53 and 54, "absobent" should read -- adsorbent --. Column 12, line 47, after "said" insert -- first --.

Signed and sealed this 17th day of March 1970.

(SEAL)
Attest:

Edward M. Fletcher, Jr.                      WILLIAM E. SCHUYLER, JR.
Attesting Officer                                     Commissioner of Patents